US010191567B2

(12) United States Patent
Hong

(10) Patent No.: US 10,191,567 B2
(45) Date of Patent: Jan. 29, 2019

(54) EITHER-HANDED REPLACEABLE MOUSE

(71) Applicant: Dexin Corporation, New Taipei (TW)

(72) Inventor: Ching-Tsun Hong, New Taipei (TW)

(73) Assignee: Dexin Corporation, New Taipei (TW)

( * ) Notice: Subject to any disclaimer, the term of this patent is extended or adjusted under 35 U.S.C. 154(b) by 0 days.

(21) Appl. No.: 15/685,021

(22) Filed: Aug. 24, 2017

(65) Prior Publication Data

US 2018/0239448 A1    Aug. 23, 2018

(30) Foreign Application Priority Data

Feb. 20, 2017  (TW) .............................. 106202442 U

(51) Int. Cl.
  *G06F 3/0354* (2013.01)
(52) U.S. Cl.
  CPC .. *G06F 3/03543* (2013.01); *G06F 2203/0332* (2013.01)
(58) Field of Classification Search
  CPC ........................... G06F 2203/0332–2203/0334
  USPC ................................................. 345/156–184
  See application file for complete search history.

(56) References Cited

U.S. PATENT DOCUMENTS

| | | | | |
|---|---|---|---|---|
| 2009/0140983 A1* | 6/2009 | Chatterjee | ........... | G06F 3/03543 345/163 |
| 2010/0171702 A1* | 7/2010 | Cheng | ................. | G06F 3/03543 345/163 |
| 2012/0092255 A1* | 4/2012 | Lin | ..................... | G06F 3/03543 345/161 |

FOREIGN PATENT DOCUMENTS

CN            204613886 U      9/2015

OTHER PUBLICATIONS

Search Report for TW106105577 dated Sep. 8, 2017.
English Translation of Search Report for TW106105577 dated Sep. 8, 2017
TW106105577 Office Action dated Sep. 26, 2017, Inventive Steps Rejection on Claims 1-3.

* cited by examiner

*Primary Examiner* — Carolyn R Edwards
(74) *Attorney, Agent, or Firm* — Woodard, Emhardt, Moriarty, McNett & Henry LLP

(57) ABSTRACT

An either-handed replaceable mouse includes: a mouse body, having a first button part and a second button part, and a replaceable top cover, covering the mouse body and having a first button area and a second button area. The first button area and the second button area are correspondingly located on the first button part and the second button part respectively. During replacement of the replaceable top cover, a height from the top of the first button area on the first button part to the bottom of the mouse body is greater than or less than a height from the top of the second button area on the second button part to the bottom of the mouse body.

6 Claims, 7 Drawing Sheets

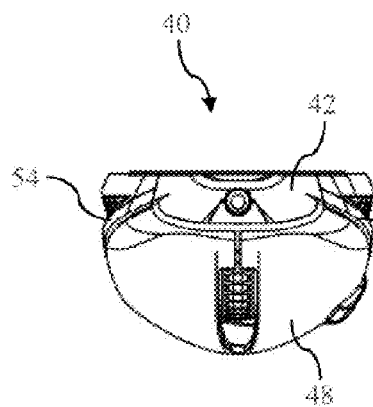
FIG. 9B
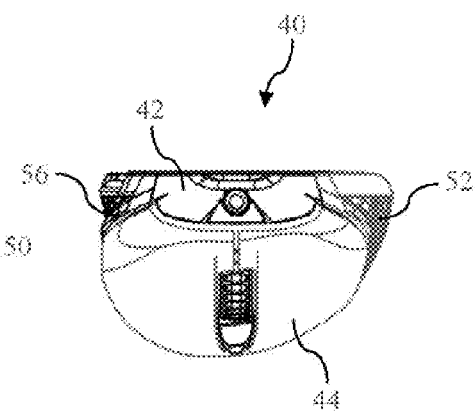
FIG. 9D
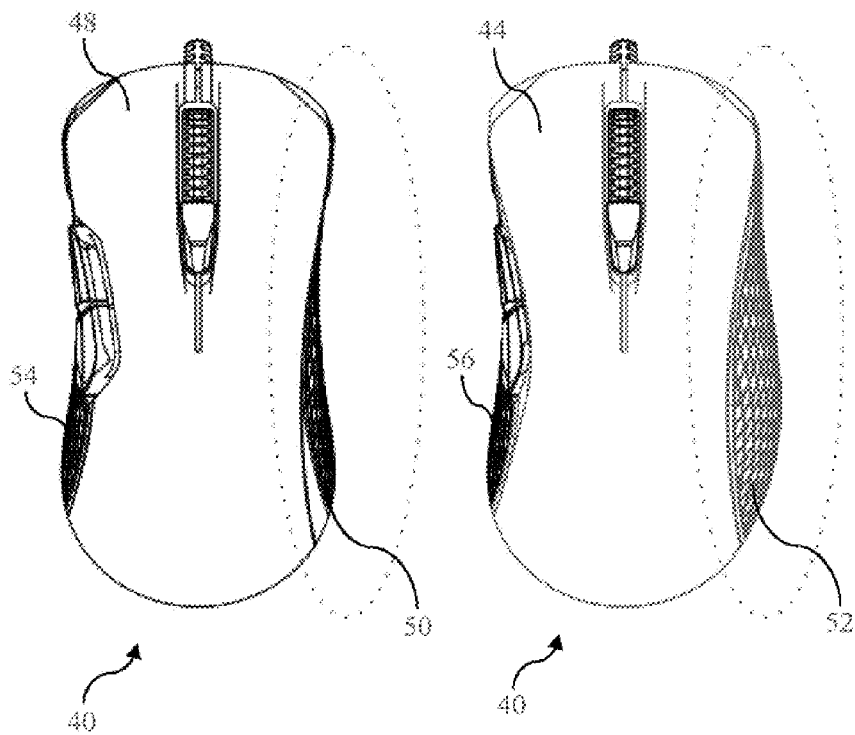
FIG. 9A
FIG. 9C

EITHER-HANDED REPLACEABLE MOUSE

TECHNICAL FIELD

The present invention relates to the field of mouse technologies, and in particular, to an either-handed replaceable mouse.

RELATED ART

With the continuous development of science and technology, computer devices, such as personal computers, notebook computers, and tablet computers, and portable mobile apparatuses of various sizes become indispensable convenient tools for daily life, entertainment, or work of people. However, mouses are commonly used input devices of the foregoing devices or apparatuses.

Although effects of mouses are constantly improved, components cannot be arbitrarily replaced due to structures of the mouses. However, different users have different usage habits (left-handedness or right-handedness), resulting in different sizes to which the mouses apply. Consequently, the users are plagued by hand feelings of operating the mouses.

SUMMARY

In view of the foregoing problem, an objective of the present invention is to provide an either-handed replaceable mouse, to facilitate dismounting and replacement of a component of the mouse, thereby generating different convenient mouse operation hand feelings due to different usage habits of users.

An aspect of the present invention provides an either-handed replaceable mouse, including:

a mouse body, having a first button part and a second button part; and a replaceable top cover, covering the mouse body and having a first button area and a second button area, the first button area and the second button area being correspondingly located on the first button part and the second button part respectively, wherein during replacement of the replaceable top cover, a height from the top of the first button area on the first button part to the bottom of the mouse body is greater than or less than a height from the top of the second button area on the second button part to the bottom of the mouse body.

According to the aspect of the present invention, the replaceable top cover includes a first cover section and a second cover section that are replaceable. A finger corresponding to the first cover section presses a component of the first button area or the second button area, and a palm corresponding to the second cover section holds a component of the mouse.

According to the aspect of the present invention, a side edge of the first button area far away from the second button area is a curved surface that is inclined downward or upward towards a side edge of the second button area far away from the first button area.

BRIEF DESCRIPTION OF THE DRAWINGS

FIG. 9A is a front view of an assembled either-handed replaceable mouse according to a third embodiment of the present invention;

FIG. 9B is a top view of FIG. 9A;

FIG. 9C is a front view of another assembled either-handed replaceable mouse according to a third embodiment of the present invention; and FIG. 9D is a top view of FIG. 9C.

DETAILED DESCRIPTION

For the purposes of promoting an understanding of the principles of the invention, the mouse with a removable button switch of the present invention is described below, and in applicants' Taiwanese priority application No. 106202442, filed Feb. 20, 2017, the entire contents of which are hereby incorporated herein by reference. The written description and drawings are intended to illustrate the invention in a fashion that allows those who are engaged in the relevant areas to understand and appreciate the invention and several of its preferred embodiments conceptually. It will nevertheless be understood that no limitation of the scope of the invention is thereby intended, with such alterations and modifications to the illustrated device being contemplated as would normally occur to one skilled in the art to which the invention relates.

Figure 1:
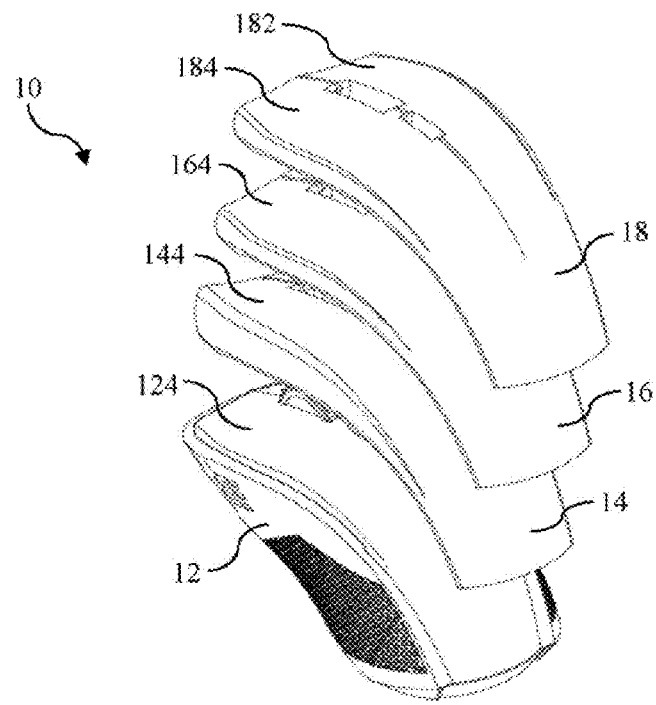
FIG. 1 is a schematic exploded view of an either-handed replaceable mouse according to a first embodiment of the present invention.
Figure 2:
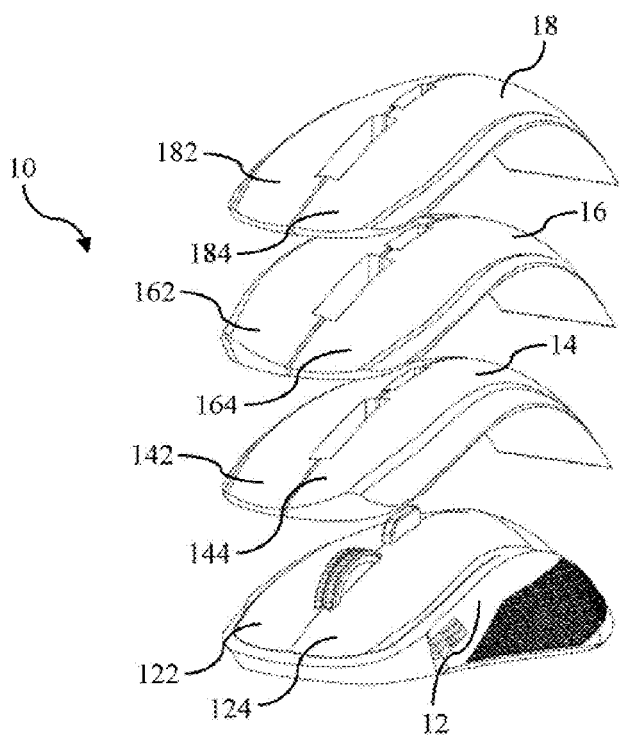
FIG. 2 is a schematic exploded view, from another perspective, of an either-handed replaceable mouse according to a first embodiment of the present invention.
Figure 3A:
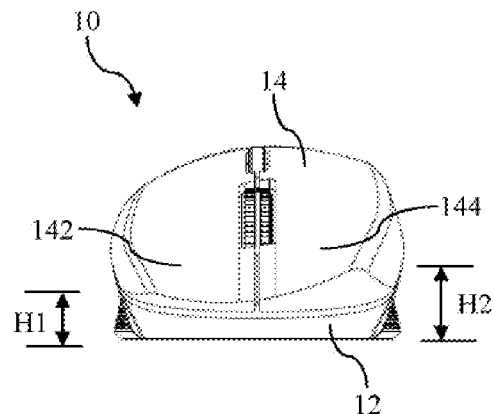
FIG. 3A to FIG. 3C are front views of an either-handed replaceable mouse with different replaceable top covers according to a first embodiment of the present invention.
Figure 3B:
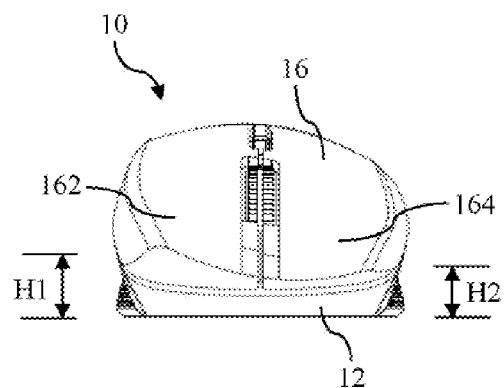
Figure 3C:
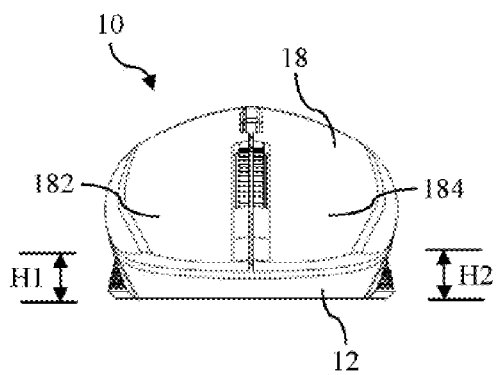

FIG. 1 is a schematic exploded view of an either-handed replaceable mouse according to a first embodiment of the present invention; FIG. 2 is a schematic exploded view, from another perspective, of the either-handed replaceable mouse according to the first embodiment of the present invention; and FIG. 3A to FIG. 3C are front views of the either-handed replaceable mouse with different replaceable top covers according to the first embodiment of the present invention.

In FIG. 1, FIG. 2, and FIG. 3A to FIG. 3C, an either-handed replaceable mouse 10 includes a mouse body 12 and replaceable top covers 14, 16, and 18. The mouse body 12 further includes components such as a scroll wheel, a controller, a switching switch, a track detector, and a battery, and the components are known by a person skilled in the art. Details are not described herein again.

The mouse body 12 has a first button part 122 and a second button part 124. The replaceable top covers 14, 16, and 18 may cover the mouse body 12 in a replaceable manner. That is, according to a usage habit (left-handedness or right-handedness) of a user, a suitable replaceable top cover is used in replacement to cover the mouse body 12.

The replaceable top cover 14, 16, and 18 have first button areas 142, 162, and 182 and second button areas 144, 164, and 184. The first button areas 142, 162, and 182 are located on the first button part 122, and the second button areas 144, 164, and 184 are located on the second button part 124. When the first button areas 142, 162, and 182 or the second button areas 144, 164, and 184 are pressed, the first button part 122 is also pressed with the first button areas 142, 162, and 182, or the second button part 124 is also pressed with the second button areas 144, 164, and 184.

In this embodiment, "the first button part" and "the second button part" described above refer to "a left button part" and "a right button part" (which are defined based on a mouse that is operated by the right hand), and "the first button area" and "the second button area" described above refer to "a left button area" and "a right button area" (which are defined based on a mouse that is operated by the right hand). In another embodiment, "the first button part" and "the second button part" described above may also refer to "a right button part" and "a left button part", and "the first button area" and "the second button area" described above may also refer to "a right button area" and "a left button area".

In FIG. 3A, the replaceable top cover 14 is used for replacement and covers the mouse body 12. A height H1 from the top of the first button area 142 on the first button part 122 to the bottom of the mouse body 12 is less than a height H2 from the top of the second button area 144 on the second button part 124 to the bottom of the mouse body 12. A side edge (the left side edge of the replaceable top cover 14 in FIG. 3A) of the first button area 142 far away from the second button area 144 is a curved surface that is inclined upward towards a side edge (the right side edge of the replaceable top cover 14 in FIG. 3A) of the second button area 144 far away from the first button area 142. Using the either-handed replaceable mouse 10 with the replaceable top cover 14 may enhance a using hand feeling of a left-handed user.

In FIG. 3B, the replaceable top cover 16 is used for replacement and covers the mouse body 12. A height H1 from the top of the first button area 162 on the first button part 122 to the bottom of the mouse body 12 is greater than a height H2 from the top of the second button area 164 on the second button part 124 to the bottom of the mouse body 12. A side edge (the left side edge of the replaceable top cover 16 in FIG. 3B) of the first button area 162 far away from the second button area 164 is a curved surface that is inclined downward towards a side edge (the right side edge of the replaceable top cover 16 in FIG. 3B) of the second button area 164 far away from the first button area 162. Using the either-handed replaceable mouse 10 with the replaceable top cover 16 may enhance a using hand feeling of a right-handed user.

In FIG. 3C, the replaceable top cover 18 is used for replacement and covers the mouse body 12. A height H1 from the top of the first button area 182 on the first button part 122 to the bottom of the mouse body 12 is equal to a height H2 from the top of the second button area 184 on the second button part 124 to the bottom of the mouse body 12. The either-handed replaceable mouse 10 with the replaceable top cover 18 is suitable for a left-handed user or a right-handed user.

Figure 4:
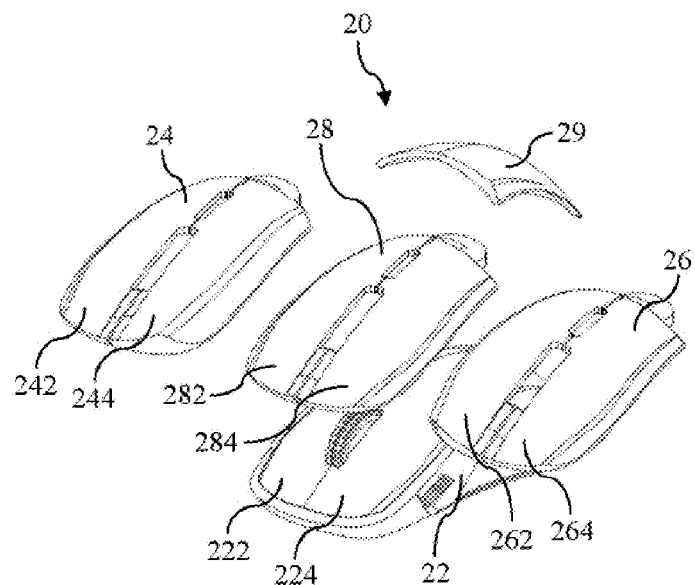
FIG. 4 is a schematic exploded view of an either-handed replaceable mouse according to a second embodiment of the present invention.
Figure 5:
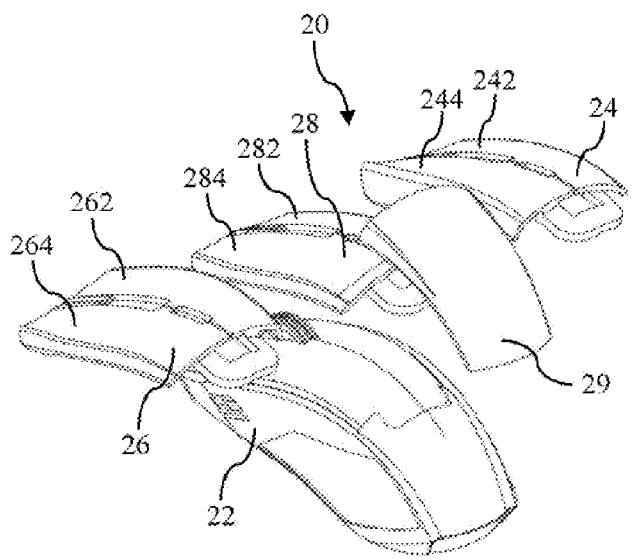
FIG. 5 is a schematic exploded view, from another perspective, of an either-handed replaceable mouse according to a second embodiment of the present invention.
Figure 6A:
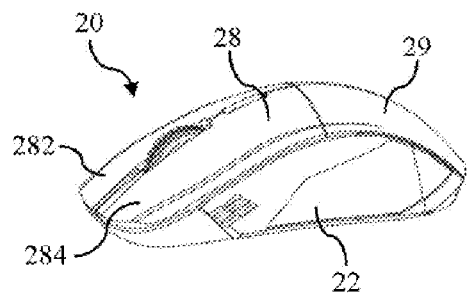
FIG. 6A to FIG. 6C are schematic diagrams of dismounting a replaceable top cover step by step according to a second embodiment of the present invention.
Figure 6B:
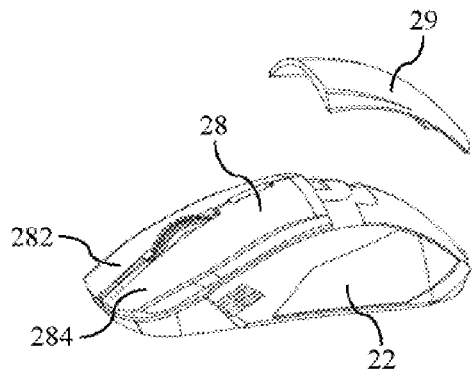
Figure 6C:
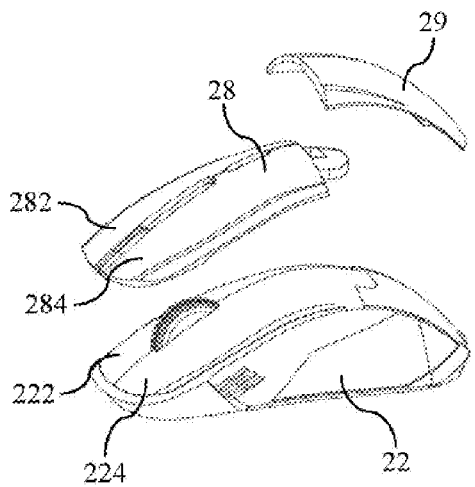

FIG. 4 is a schematic exploded view of an either-handed replaceable mouse according to a second embodiment of the present invention; FIG. 5 is a schematic exploded view, from another perspective, of the either-handed replaceable mouse according to the second embodiment of the present invention; and FIG. 6A to FIG. 6C are schematic diagrams of dismounting a replaceable top cover step by step according to the second embodiment of the present invention.

In FIG. 4, FIG. 5, and FIG. 6A to FIG. 6C, an either-handed replaceable mouse 20 includes a mouse body 22 and replaceable top covers. The replaceable top covers include a first cover section 29 and second cover sections 24, 26, and 28.

The mouse body 22 has a first button part 222 and a second button part 224. The first cover section 29 and the second cover sections 24, 26, and 28 may cover the mouse body 22 in a replaceable manner. That is, according to a usage habit (left-handedness or right-handedness) of a user, a suitable second cover section is used in replacement on the moue to cover the mouse body 12.

The second cover sections 24, 26, and 28 have first button areas 242, 262, and 282 and second button areas 244, 264, and 284. The first button areas 242, 262, and 282 are located on the first button part 222 and the second button part 224, and the second button areas 244, 264, and 284 are located on the second button part 224. When the first button areas 242, 262, and 282 or the second button areas 244, 264, and 284 are pressed, the first button part 222 is also pressed with the first button areas 242, 262, and 282, or the second button part 224 is also pressed with the second button areas 244, 264, and 284.

The second embodiment is similar to the first embodiment. The second cover section 24 is used for replacement and covers the mouse body 22. A height from the top of the first button area 242 on the first button part 222 to the bottom of the mouse body 22 is less than a height from the top of the second button area 244 on the second button part 224 to the bottom of the mouse body 22. A side edge of the first button area 242 far away from the second button area 244 is a curved surface that is inclined upward towards a side edge of the second button area 244 far away from the first button area 242. Using the either-handed replaceable mouse 20 with the second cover section 24 may enhance a using hand feeling of a left-handed user.

The second cover section 26 is used for replacement and covers the mouse body 22. A height from the top of the first button area 262 on the first button part 222 to the bottom of the mouse body 22 is greater than a height from the top of the second button area 264 on the second button part 224 to the bottom of the mouse body 22. A side edge of the first button area 262 far away from the second button area 264 is a curved surface that is inclined downward towards a side edge of the second button area 264 far away from the first button area 262. Using the either-handed replaceable mouse 20 with the second cover section 26 may enhance a using hand feeling of a right-handed user.

The second cover section 28 is used for replacement and covers the mouse body 22. A height from the top of the first button area 282 on the first button part 222 to the bottom of the mouse body 22 is equal to a height from the top of the second button area 284 on the second button part 224 to the bottom of the mouse body 22. The either-handed replaceable mouse 20 with the second cover section 28 is suitable for a left-handed user or a right-handed user.

The first embodiment and second embodiment describe replacement of a replaceable top cover according to a usage habit of a user, and a third embodiment below describes replacement of a replaceable side plate according to the usage habit of the user.

Figure 7A:
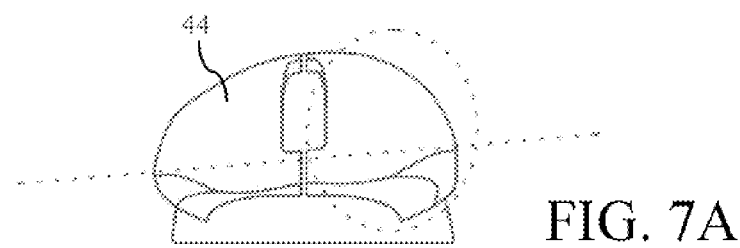
FIG. 7A and FIG. 7B are front views of a replaceable top cover according to a third embodiment of the present invention.
Figure 7B:
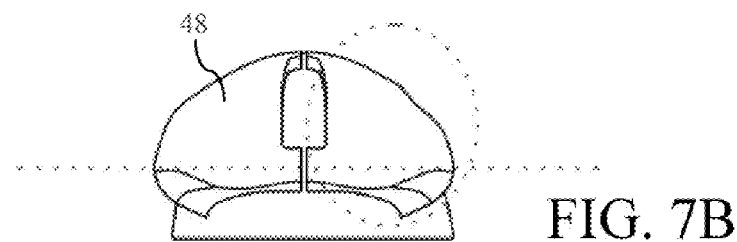
Figure 7C:
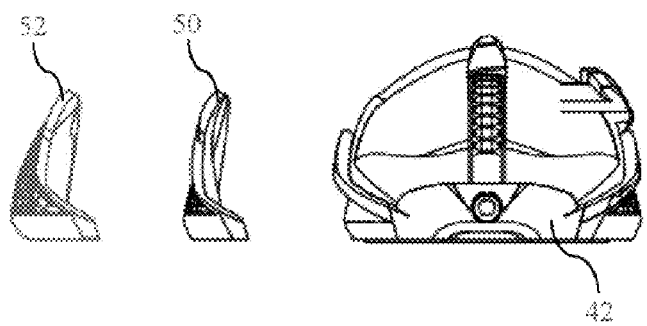
FIG. 7C is a front view of a mouse body and replaceable side plates according to a third embodiment of the present invention.
Figure 8A:
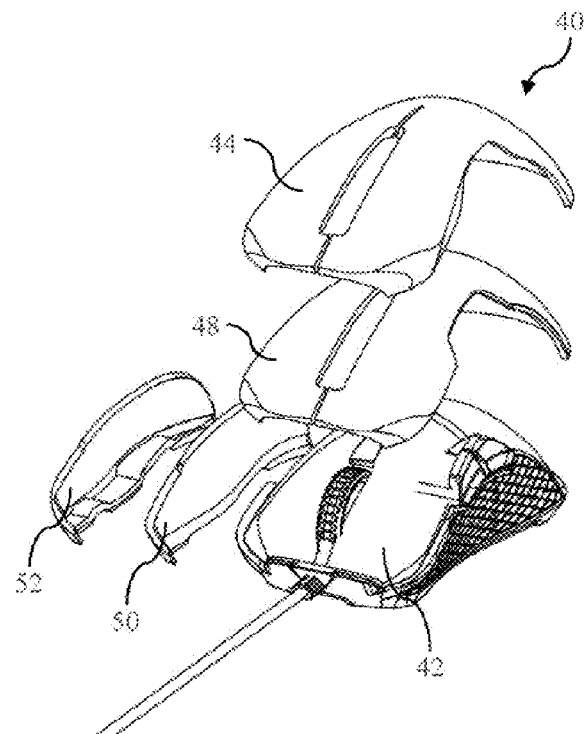
FIG. 8A is an exploded view of an either-handed replaceable mouse with different replaceable top covers and a replaceable side plate according to a third embodiment of the present invention.
Figure 8B:
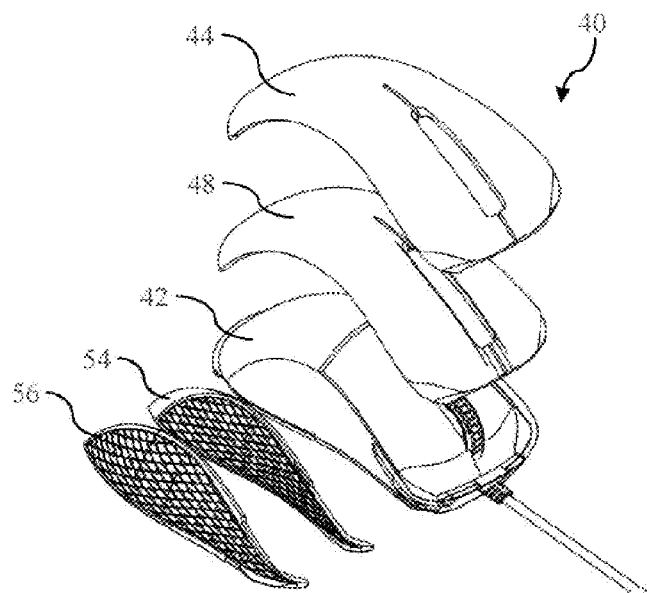
FIG. 8B is an exploded view of an either-handed replaceable mouse with different replaceable top covers and another replaceable side plate according to a third embodiment of the present invention.

FIG. 7A and FIG. 7B are front views of a replaceable top cover according to a third embodiment of the present invention; FIG. 7C is a front view of a mouse body and replaceable side plates according to a third embodiment of the present invention; FIG. 8A is an exploded view of an either-handed replaceable mouse with different replaceable top covers and a replaceable side plate according to a third embodiment of the present invention; FIG. 8B is an exploded view of an either-handed replaceable mouse with different replaceable top covers and another replaceable side plate according to a third embodiment of the present invention; FIG. 9A is a front view of an assembled either-handed replaceable mouse according to a third embodiment of the present invention; FIG. 9B is a top view of FIG. 9A; FIG. 9C is a front view of another assembled either-handed replaceable mouse according to a third embodiment of the present invention; and FIG. 9D is a top view of FIG. 9C.

In the third embodiment, an either-handed replaceable mouse 40 includes a mouse body 42, replaceable top covers 44 and 48, first replaceable side plates 50 and 52, and second replaceable side plates 54 and 56. The replaceable top covers 44 and 48 have a same structure as the replaceable top covers in the first embodiment and second embodiment, and details are not described herein again.

In the mouse 40 shown in FIG. 9A and FIG. 9B, the first replaceable side plate 50 and the second replaceable side plate 54 are assembled. The first replaceable side plate 50 and the second replaceable side plate 54 have the same radian and thickness, so that the left and right sides of the mouse 40 are symmetrically configured, thereby being applicable to a left-handed or right-handed user.

If the mouse needs to be adapted to a right-handed user, the first replaceable side plate 52 and the second replaceable side plate 56 are assembled in the mouse 40. The first replaceable side plate 52 and the second replaceable side plate 56 have different radians, and the second replaceable side plate 56 is slightly thicker than the first replaceable side plate 52, so that the mouse 40 is configured asymmetrically: the left side is concave inwardly while the right side protrudes outwardly (as shown in FIG. 9C), to make it easy for a right-handed user to operate the mouse 40.

Likewise, if the mouse needs to be adapted to a left-handed user, the first replaceable side plate and the second replaceable side plate are assembled in the mouse 40. The first replaceable side plate and the second replaceable side plate have different radians, and the first replaceable side plate is slightly thicker than the second replaceable side plate, so that the mouse is configured asymmetrically: the left side protrudes outwardly while the right side is concave inwardly (not shown in the figure), to make it easy for a left-handed user to operate the mouse.

The present invention provides an either-handed replaceable mouse, so as to facilitate dismounting and replacement of a component of the mouse, thereby generating different convenient mouse operation hand feelings due to different usage habits of users.

In the context of this written description, the following terms and reference numerals have been used:
Either-handed replaceable mouse 10
Mouse body 12
Replaceable top cover 14
Replaceable top cover 16
Replaceable top cover 18
Either-handed replaceable mouse 20
Mouse body 22
Second cover section 24
Second cover section 26
Second cover section 28
First cover section 29
Mouse 40
Mouse body 42
Replaceable top cover 44
Replaceable top cover 48
First replaceable side plate 50
First replaceable side plate 52
Second replaceable side plate 54
Second replaceable side plate 56
First button part 122
Second button part 124
First button area 142
Second button area 144
First button area 162
Second button area 164
First button area 182
Second button area 184
First button part 222
Second button part 224
First button area 242
Second button area 244
First button area 262
Second button area 264
First button area 282
Second button area 284

While the invention has been illustrated and described in detail in the drawings and foregoing description, the same is to be considered as illustrative and not restrictive in character, it being understood that only certain preferred embodiments have been shown and described, and that all changes and modifications that come within the spirit of the invention are desired to be protected.

Additionally, it is to be appreciated that the present invention may comprise or consist essentially of any or all of the described or illustrated elements. Further, any or all of the features, elements, and/or embodiments disclosed herein may be combined with any or all of the other features, elements, and/or embodiments disclosed herein to provide an invention that comprises or consists essentially of such features, elements, and/or embodiments.

The invention claimed is:
1. An either-handed replaceable mouse, comprising:
a mouse body, having a first button part and a second button part;
a first replaceable top cover, effective for covering the mouse body and having a first button area and a second button area, the first button area and the second button area being correspondingly located on the first button part and the second button part respectively,
wherein said first replaceable top cover, when mounted to said mouse body, provides a height from the top of the first button area on the first button part to the bottom of the mouse body that is greater than the height from the top of the second button area on the second button part to the bottom of the mouse body; and
a second replaceable top cover, effective for covering the mouse body and having a first button area and a second button area, the first button area and the second button area being correspondingly located on the first button part and the second button part respectively,
wherein said second replaceable top cover, when mounted to said mouse body, provides a height from the top of the first button area on the first button part to the bottom of the mouse body that is less than the height from the top of the second button area on the second button part to the bottom of the mouse body.

2. The either-handed replaceable mouse according to claim 1, wherein each of said replaceable top covers comprises a first cover section and a second cover section that are replaceable, a finger corresponding to the first cover section presses a component of the first button area or the second button area, and a palm corresponding to the second cover section holds a component of the mouse.

3. The either-handed replaceable mouse according to claim 1, wherein said first replaceable top cover has a side edge of the first button area far away from the second button area that is a curved surface that is inclined downward towards a side edge of the second button area far away from the first button area; and wherein said second replaceable top cover has a side edge of the first button area far away from the second button area that is a curved surface that is inclined upward towards a side edge of the second button area far away from the first button area.

4. The either-handed replaceable mouse according to claim 1, further comprising a first replaceable side plate and a second replaceable side plate, which are assembled on the left side and right side of the mouse respectively.

5. The either-handed replaceable mouse according to claim 4, wherein the first replaceable side plate and the second replaceable side plate have identical or different radians and thicknesses.

6. The either-handed replaceable mouse according to claim 1, and further including a third replaceable top cover, effective for covering the mouse body and having a first button area and a second button area, the first button area and the second button area being correspondingly located on the first button part and the second button part respectively, wherein said third replaceable top cover has a height from the top of the first button area on the first button part to the bottom of the mouse body that is equal to the height from the top of the second button area on the second button part to the bottom of the mouse body.

\* \* \* \* \*